(No Model.)
R. W. BOOTH.
LAWN TENNIS FORK.
No. 494,913.   Patented Apr. 4, 1893.
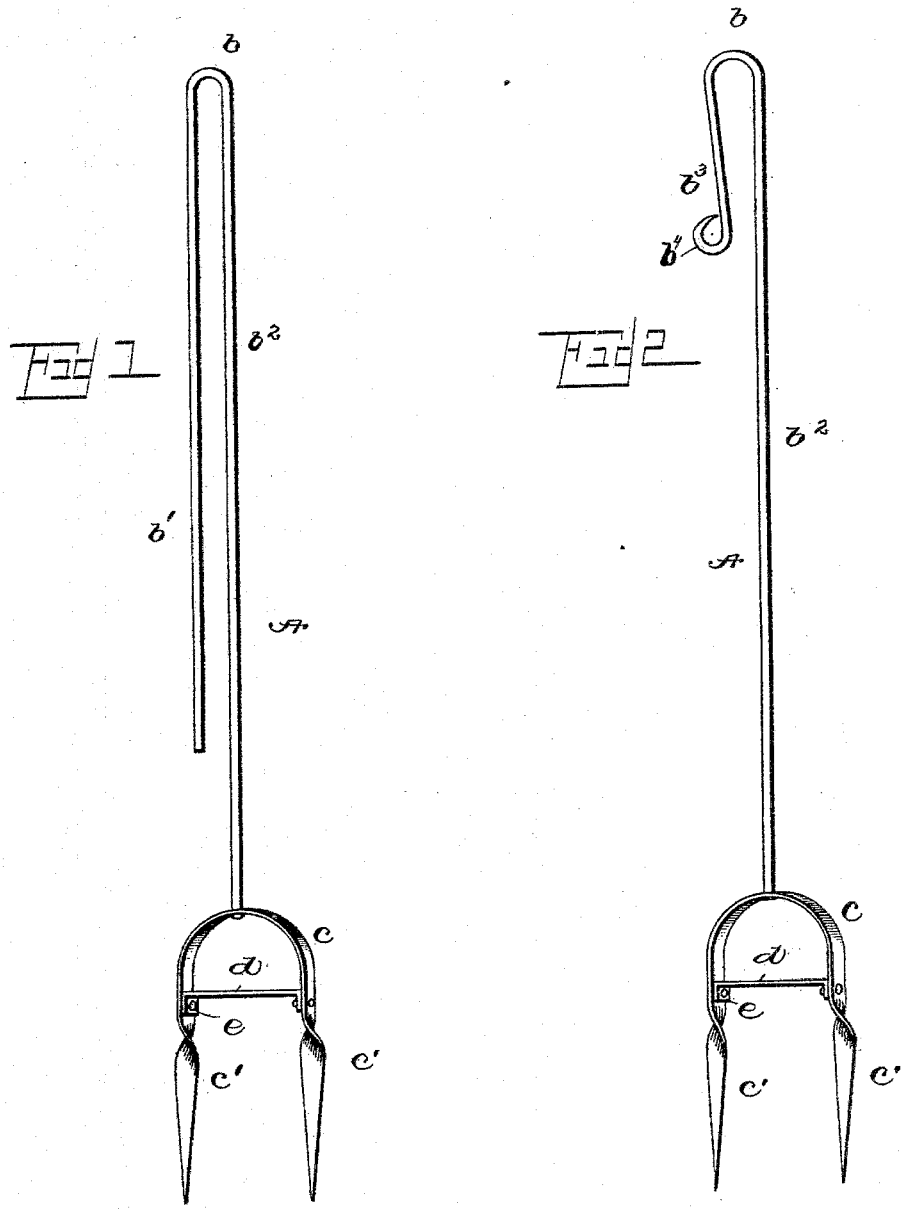
Witnesses
Inventor
Ralph W. Booth
By his Attorney

UNITED STATES PATENT OFFICE.

RALPH W. BOOTH, OF NEW BRUNSWICK, NEW JERSEY.

LAWN-TENNIS FORK.

SPECIFICATION forming part of Letters Patent No. 494,913, dated April 4, 1893.

Application filed March 28, 1892. Serial No. 426,829. (No model.)

*To all whom it may concern:*

Be it known that I, RALPH W. BOOTH, a citizen of the United States, residing at New Brunswick, in the county of Middlesex and State of New Jersey, have invented certain new and useful Improvements in Lawn-Tennis Forks; and I do hereby declare the following to be a full, clear, and exact description of the invention, such as will enable others skilled in the art to which it appertains to make and use the same.

Figure 1 is a perspective view of this device. Fig. 2 is a like view of a modification of it.

This invention belongs to that class of devices known as tennis forks, the use of which is to keep the central part of the net in position during the game, and the novelty consists in the structure of the device, and in the device as a whole; all as will now be more fully described, as well as pointed out in the claims.

Heretofore, devices of the general character have been made which consisted of a wire or rod so bent that one part was a little longer than the other; the longer part being pointed and adapted to be thrust into the ground to hold it in place. But this kind of fork would turn about and get tangled in the net; nor was it always easy to keep this kind of a fork in the ground so that it should not have a tendency to sway or lean to the one side or the other.

My invention has for its object to provide a lower end for entering the ground that can be easily thrust home to a definite distance; a pair of tines that will prevent any side or otherwise movement; to so connect the tines that they shall not flare apart; in a word, to produce a tennis fork of such shape and structure that it should always be adapted to have a firm position when in the ground; to be at once strong, durable cheap and ornamental and adapted for easy handling, all as I will now more in detail proceed to explain as well as point out in the appended claims.

In the accompanying drawings, A, denotes the lawn tennis fork. The portion that comes over the net, which is bent at, $b$, is of metal, which may be of any form in cross section but preferably round as a wire rod, one part, $b'$, of which is free ended, but the other, $b^2$, is extended beyond the part, $b'$, and at its end is screwed, headed or otherwise securely fixed in the center of the arch, $c$. This arch is of metal and preferably flat, but its lower extended ends or tines, $c$, are flattened and twisted or bent at right angles to the arch, and are sharpened at the points for easy insertion into the ground. This shape of arch and tine gives a peculiar strength and rigidity to the tines; but to insure their mutual relation to each other, I use a brace, $d$, just above the point where the arch ends and the tines begin. This brace is a piece of flat or other shaped metal of suitable length horizontally placed and properly secured at its ends to the arch, as now illustrated, and this is done by bending the ends of the brace and fastening them to the arch by headed bolts, $e$. But the attachment can be made in any suitable manner or way the mechanic chooses to employ. As thus made, the brace will not only hold the tines firmly in relative position, but will also answer as a guide to regulate the distance the tines are to be forced into the ground. The arch will not in the least interfere with the lower edge of the net. Preferably, the tines should be in a plane with portions, $b'$, and, $b^3$, or, $b^2$, and the bent top, for this structure seems to give the best results. The method of the application of the net to the fork is well known to tennis players and need not be dwelt upon. But in the modification shown in Fig. 2, the top edge of the net can be brought under the short bend, $b^3$, of the device; and it may be found desirable to make this bend a sort of spring to clamp the edge of the net between the bend and main body of the device. It is also desirable to bend the free end of it so as to project in toward and then extend away from the longer arm, as by forming it into an eye $b^4$, which will facilitate the entry of the net between it and the longer arm when the shorter arm is to be utilized as a clamp.

What I claim is—

1. In a lawn tennis fork, the combination with an arched base or support, of a rod secured thereto, and a flat base secured horizontally between the ends of the arch above the points to limit the distance the ends may penetrate the soil, substantially as set forth.

2. In a lawn tennis fork, the combination with an arched base or support, of a rod rigidly secured thereto, the ends of the arch being sharpened and twisted to occupy substantially the same plane as the arch, and a brace secured to the inner portions of the arch just above the twisted portions of the ends, substantially as set forth.

In testimony whereof I affix my signature in presence of two witnesses.

RALPH W. BOOTH.

Witnesses:
A. T. LANDMESSER,
HENRY STEVENS.